INVENTORS
GRAHAM COOK
FREDERICK A. LORY
FRANK W. JENKINS

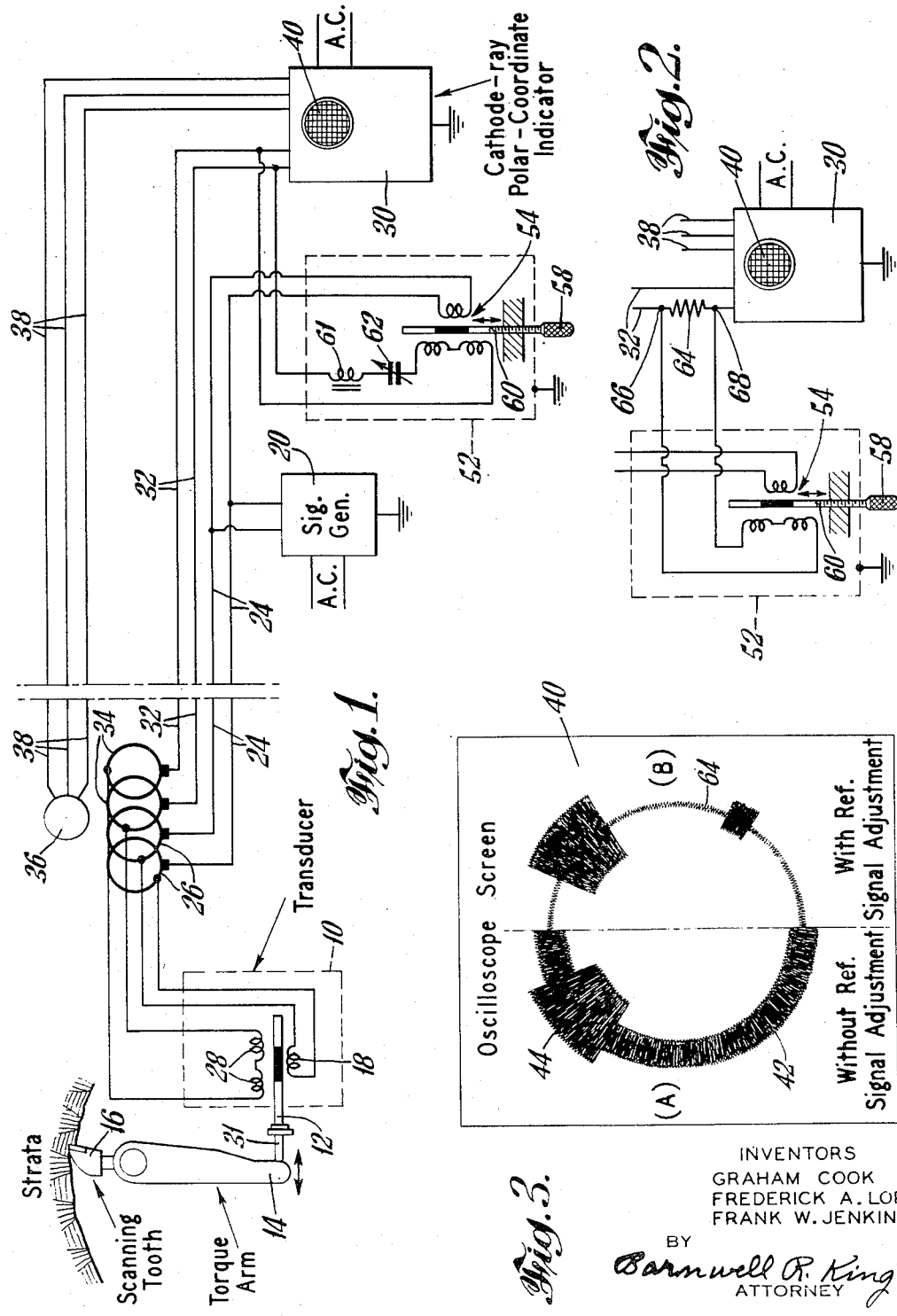

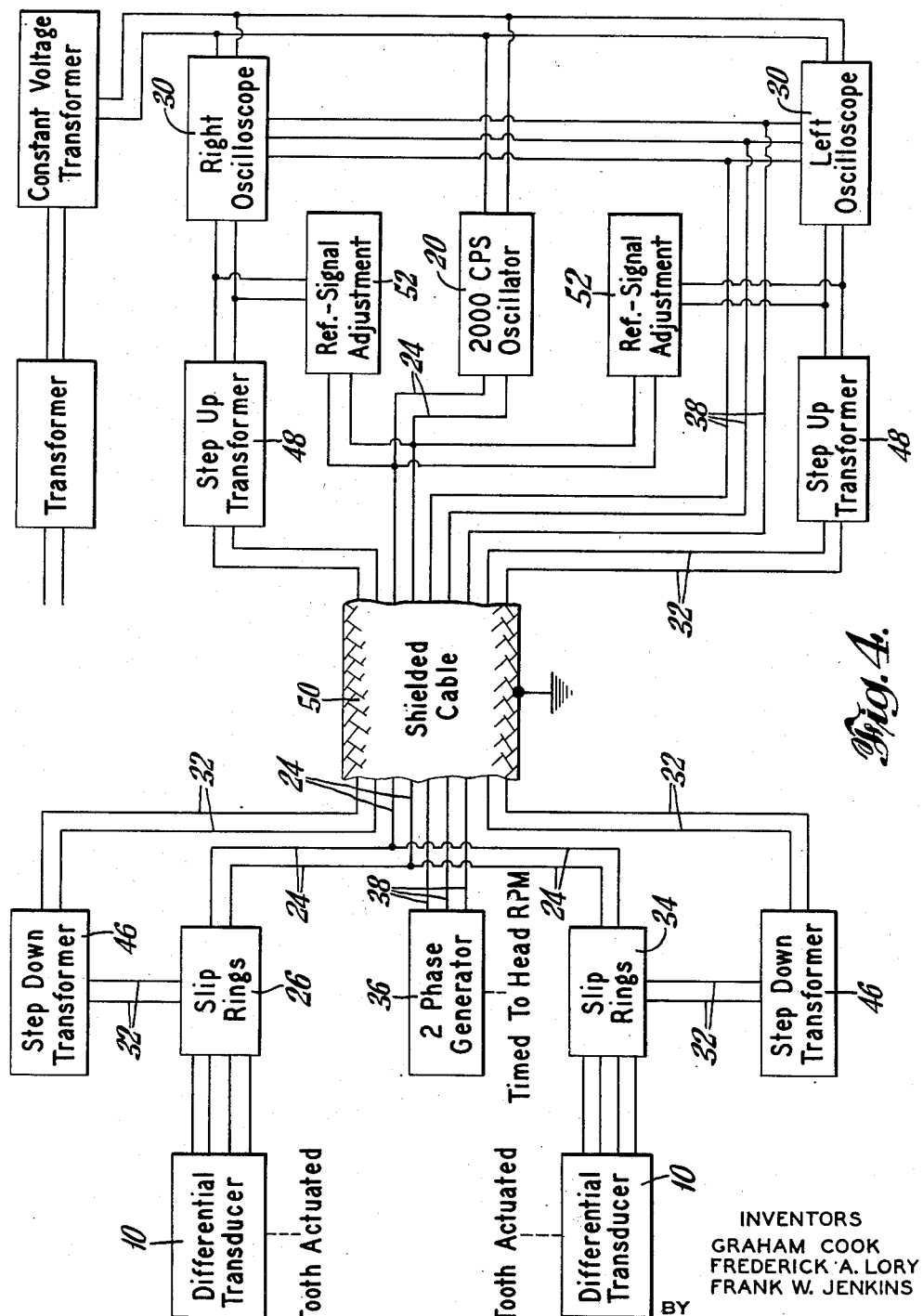

2,790,968
STRATASCOPE REFERENCE SIGNAL ADJUSTING MEANS

Graham Cook, Frederick A. Lory, and Frank W. Jenkins, South Charleston, W. Va., assignors to Union Carbide and Carbon Corporation, a corporation of New York Application August 27, 1954, Serial No. 452,676

8 Claims. (Cl. 340—261)

This invention relates to automatic signalling and more particularly to earth strata scanning-course indicating systems for remotely controlled bore-mining machines of the type disclosed in the applications of Alspaugh et al., Serial No. 85,222, filed April 2, 1949, and Serial No. 353,932, filed May 11, 1953.

Remote control of a bore-mining machine of such type depends in a large part on an automatic signalling system called a "stratascope" of the type disclosed in the Alspaugh and Cook Patent No. 2,620,386. Such system supplies intelligence to an operator located at a control station as to whether the machine is cutting in a selected coal seam, for example, or in the strata immediately above or below it. If the coal consists of strata of differing hardness, the stratascope continuously pictures the relative hardness of such coal strata. Such stratascope includes a mechanical sensing element mounted on a cutter head, a transducer to convert mechanical movements of the sensing element into electrical impulses, a suitable electrical circuit for transmitting such impulses to the control station, and an oscilloscope for translating the electrical impulses into a pattern of visual signals.

Improvements were made (Serial No. 310,526, Felbeck, Cook and Cosner, now Patent No. 2,752,591) which included moving the sensing element to a forward position on the cutter head, substituting a spring actuated mechanical arrangement for the rubber actuated system, and replacing the inertia carbon pile pickup with a transducer comprising a variable differential transformer.

In order to provide optimum sensitivity and definition in the image produced on the oscilloscope screen it is necessary to have an essentially constant no-load reference signal of minimum value. In the system described in application Serial No. 310,526 attempts were made to do this by mechanically adjusting the no-load position. This was done by two methods, one by careful adjustment of the spring tension, the other by installing and adjusting a mechanical stop. Such adjustments could only be made if the machine were located at an accessible point, such as the launching platform, and if the cutter heads were idle. Both adjustments were difficult. Despite careful initial adjustment the reference signal tended to shift during the course of machine operation. The stop was especially bad in this respect. If designed with fine screw threads for precise adjustment it was not sufficiently rugged to maintain its setting under the steady pounding of the rocker arm. The two metal surfaces (the rocker arm and the stop) wore rapidly and excessively under the severe vibration of the machine which approaches a frequency of several thousand vibrations per minute. Such wear resulted in a "negative" signal, that is, the transducer core drifted from one to the other side of center. The resulting oscilloscope pattern could not be interpreted by the operator.

The present invention provides a novel electronic method of and means for balancing the output of the transducer at the "no-load" point. The invention comprises several electronic elements in a new combination which results in greatly improved operation.

According to the invention there is provided in a strata indicating-scanning system the combination of a signal transmitting circuit including a signal source comprising a differential transformer that is responsive to the different strata being scanned, a signal receiver comprising, for example, a cathode ray polar-coordinate oscilloscope which indicates continuously such different strata by the relative thickness of an annular trace on the screen of such oscilloscope, and a novel reference signal adjustment for such system. The latter, in one modification, includes a balancing differential transformer connected in a novel manner with such signal circuit through an adjustable phase-shift network, such balancing differential transformer having an adjustable core. Such novel connection is preferably in parallel, but the differential transformer may be connected across a suitable resistor in series with the signal circuit. Thus, by means of either or both of such adjustable components the value of such reference signal can be controlled. Other modifications of the invention are described below.

With this invention the operator is able to reset the output of the scanner tooth transducer to the minimum value under no-load conditions, although the machine may be several hundred feet in a bore hole and entirely inaccessible. This is done by accurately adjusting the reference signal adjustment which is located at the control station. Precise adjustment is obtained by means of a micrometer screw arrangement.

In the drawings:

Fig. 1 is a circuit diagram illustrating the invention;

Fig. 2 is a partial circuit diagram of a modification;

Fig. 3 is a view in front elevation of the screen of a receiver illustrating a trace pattern half with and half without the reference signal adjustment of the invention;

Fig. 4 is a block diagram of a dual stratascope system as applied to a remotely controlled coal mining machine of the type disclosed in application Serial No. 353,932.

Figure 5:
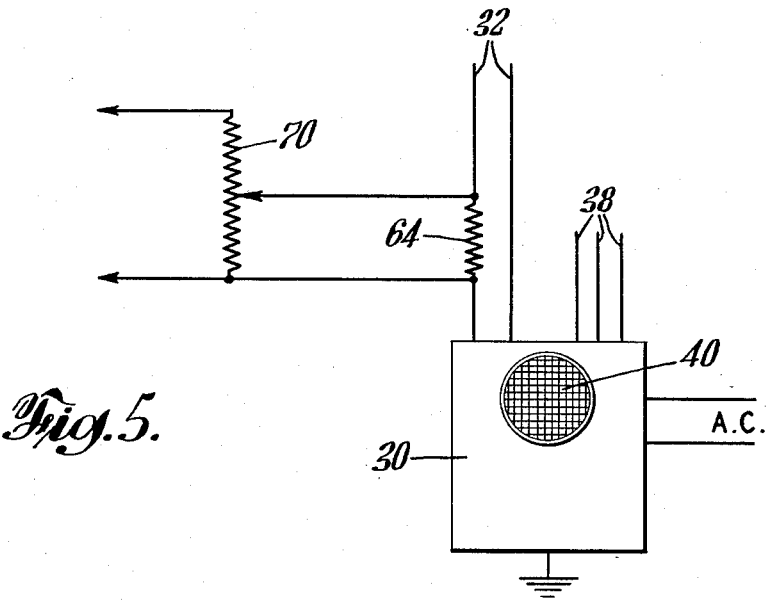
Figs. 5 and 6 are circuit diagrams of further modifications of the invention.

As shown in Fig. 1, a novel stratascope is provided that includes a transducer 10 having an armature consisting of an iron core 12 that is coupled to a torque arm 14 which is operatively connected to a strata scanning-cutting tooth 16. Such transducer is provided with a primary winding or coil 18 that is energized by an A. C. signal generator 20 through a circuit 24 comprising slip rings 26; and with a pair of secondary windings or coils 28 that energize a cathode-ray polar-coordinate indicator 30 through a signal transmitting circuit 32 including slip rings 34.

The transducer 10 consists essentially of a transformer having the single primary winding 18 flanked by the two secondary windings 28, one on either side; and all wound on a hollow cylindrical form. The two secondary windings are connected in series in such manner that when the primary winding is excited by the alternating current, the output of one secondary winding opposes the other. Because the coils are coupled by flux linkage which passes through the center of the coils, the net output can be altered by positioning the iron core 12 in the bore of the hollow form. Due to the described arrangement, as the core 12 is moved axially in the bore, the output of the transducer 10 will vary from a maximum value through a minimum and back to a maximum again. The output signal is an alternating current, having the same frequency as the exciting current, however, the values obtained on one side of the minimum balance point are, electrically speaking, 180 degrees out of phase with those obtained on the other side.

The device 10 consists essentially of a replaceable cartridge assembly designed to be mounted in the scanner unit and to operate in conjunction with the mechanical elements of the sensing mechanism. When the cartridge is properly installed, a spherical end of the core-rod 31 engages a corresponding recess in the end of the torque-arm 14 and is adapted by means of a cartridge spring to follow its movements. By restraining the other end of the core-rod any displacement of the torque-arm is converted to essentially linear motion in the core-rod, and results in moving the soft iron core 12 axially in and out of the hollow bore of the transformer. The design of the cartridge is such that the iron core 12 is normally positioned approximately in the center of the transformer when it is properly assembled.

The scanning device which includes the transducer 10 is mounted on a rotary cutting head of the bore-mining machine, which head also drives a two-phase generator 36 that is electrically connected to the indicator 30 by three conductors 38. Thus, as the head bores or cuts into the strata being mined, the oscilloscope screen 40, Fig. 3, of the indicator 30 produces a trace A having a base 42 and a strata signal 44, for example.

The stratascope of Fig. 1 is duplicated as shown in Fig. 4 for that type of bore-mining machine having two transversely spaced cutting heads. In such case the exciting current for both transducer primaries is supplied by a single signal generator 20 (such as a 2,000 C. P. S. oscillator) through a common circuit 24. On the other hand, a separate circuit 32 is provided to transmit the signals from each transducer secondary to its respective oscilloscope 30. Aside from the mechanical components required to implement it, each signal circuit 32 comprises the transducer secondary, two impedance matching transformers 46 and 48 and an oscilloscope 30. The two impedance matching transformers, one 46 on the machine and one 48 at the control station, are essential to efficient signal transmission through the cable 50 which, in some cases, is as much as 1,000 feet long.

Fundamentally, however, the signal from the transducer 10 in the scanner unit is applied to the corresponding oscilloscope 30, an electronic instrument embodying a cathode-ray tube having a fluorescent screen 40, in such a manner that an electron beam in the tube, which traces a path on the screen, is deflected at right angles to such path; the amplitude of the deflection being proportional to the applied signal strength. In the particular instrument illustrated, provisions have also been made to make the path traced by the beam on the screen a circle and to synchronize the sweep of the beam around the circular path with the rotation of the scanner unit mounted on the corresponding cutter head; thus simulating the outline of the cut being made by the sensing element. This is implemented by using the output of the small two-phase alternating current generator 36 geared to one of the main cutter head shafts, to drive and time the sweep circuit of the oscilloscope. Such synchronizing circuit involves the three conductors 38.

In order to provide for optimum sensitivity and definition in the image reproduced on the oscilloscope screen 40, Fig. 3, it is desirable to have an essentially constant reference signal 42 of minimum value. In view of the high degree of mechanical precision required to obtain the minimum signal and of the effect of the long cable 50, Fig. 4, on this signal, it has been discovered to be more advantageous to effect this precise final adjustment, electrically, near the oscilloscope 30. To accomplish this, according to our invention, a novel device 52 which is termed the "reference signal adjustment" is connected, as shown in Fig. 1, in parallel with the signal circuit 32. Such device 52 consists essentially of a transducer assembly 54 and a tuning circuit or phase-shift network comprising a variable capacitor 62 and a choke-coil 61. With such combination, by the proper adjustment of a precision micrometer head 58 attached to a core-rod 60, and a dial provided for the variable capacitor 62, any residual no-load signal such as part 64 of the trace B, Fig. 3, can be reduced to a practical operating minimum (20–50 millivolts). Because of the sensitivity of their respective circuits to induced currents, it is essential that the case of both the oscilloscope and the reference signal adjustment 52 be well grounded.

A variation of our reference signal adjusting circuit is shown in Fig. 2 in which the differential transformer 54 is, in effect, connected in series with the output signal circuit 32 and the phase shift network is omitted, by means of a resistor 64 connected between points 66 and 68 of such circuit. The no-load or reference signal of this arrangement, Fig. 2, however, is not as low as that obtained with the combination shown in Fig. 1, but there is only one adjustment to make, i. e., that of the core-rod 58.

Another modification of our invention is shown in Fig. 5 in which the balancing differential transformer is replaced by an adjustable voltage source 70, such as a potentiometer, that is connected in parallel with the resistor 64 or other suitable impedance in the signal circuit to the oscilloscope 30. The potentiometer 70 provides an adjustable bucking voltage which is applied across the impedance 64 to control the reference signal.

Figure 6:
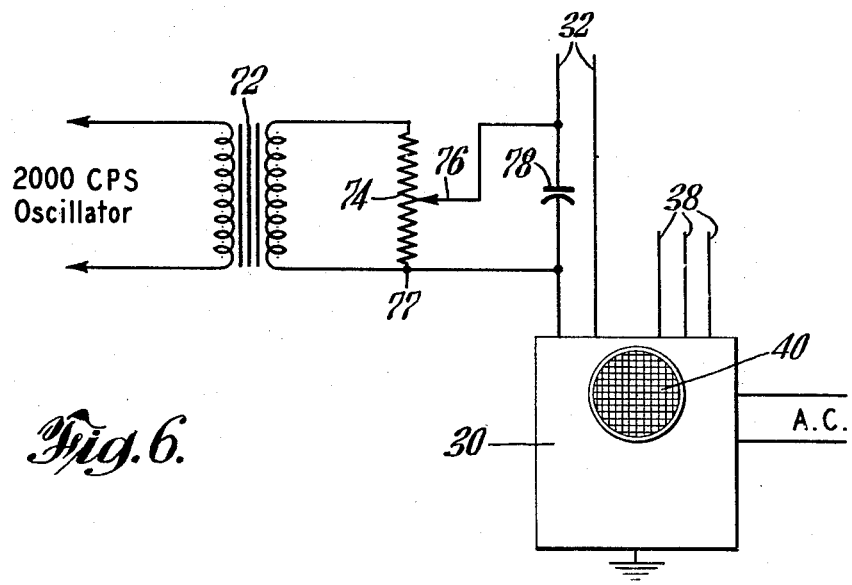

Another variation of our reference signal adjusting circuit is shown in Fig. 6 in which a bucking voltage from the 2000 cycle oscillator is introduced in series, but 180 degrees out of phase, with the signal from the stratascope. This circuit consists of an isolation transformer 72, the primary of which is connected to the signal generator 20, and the secondary of which transformer 72 is connected to the fixed terminals of a potentiometer 74. Any desired value of voltage can be obtained between the slider 76, and one of a fixed terminal 77 of the potentiometer 74, which voltage is made 180 degrees out of phase with the signal voltage from the stratascope by means of properly connecting the input to the isolation transformer 72 to the signal generator. The bucking voltage from this slider 76 is connected in series with the signal from the stratascope, but being 180 degrees out of phase, tends to neutralize the stratascope signal. A capacitor 78, is connected between the slider 76 and the fixed terminal 77 on the potentiometer to cause a minor shift in phase of the bucking voltage, to secure exact phase matching.

The device of the invention is used in the following manner. Before the machine starts to bore a new bore hole and while it is still on the launching platform, careful adjustments are made on the springs and the mechanical stop, to the point that the no-load signal of the transducer is so low that the circular trace on the oscilloscope appears as a thin line. As the machine cuts into the bore hole, signals which characterize the strata being cut appear on the oscilloscope. These signals are radial, that is, they are directed toward and away from the center of the screen, and hence are at right angles to the trace. As cutting proceeds, the no-load signal of the system changes, due to the reasons listed earlier. This increases to the point that the circular no-load trace is no longer a thin line, but a wide band 42, Fig. 4. Obviously this interferes with the load signals 44; they still appear, but from a broad base instead of a narrow base. Under conditions resulting in wear of the mechanical stop, so-called "negative" signals also appear.

As soon as this no-load signal shift occurs, the operator immediately adjusts the device 58 until the basic trace again appears as a thin line 64. During the course of subsequent operation he restores the low reference signal by repeating the same operation as many times as necessary.

A great advantage of the present invention is the fact that existing cable wires are utilized which is important in case of multiple installations where the conductors are limited in number in the signal cables, such as those employed in remotely controlled mining machines.

What is claimed is:

1. In a strata indicating-scanning system the combination of a signal transmitting circuit including a signal source comprising a differential transformer for producing an output signal that is responsive to the different strata being scanned, a signal receiver which indicates continuously such different strata by the relative value of such signal, and an adjustment therefor by means of which the no-load value of such signal can be adjusted while the system is in operation.

2. In a strata indicating-scanning system the combination of a signal transmitting circuit including a signal source comprising a differential transformer for producing an output signal that is responsive to the different strata being scanned, a signal receiver which indicates continuously such different strata by the relative value of such signal, and an adjustment therefor comprising a balancing differential transformer connected with such signal circuit, said balancing differential transformer having an adjustable component by means of which the no-load value of such signal can be set.

3. In a strata indicating-scanning system the combination with a signal transmitting circuit including a signal source comprising a differential transformer that is responsive to the different strata being scanned, and a signal receiver comprising a cathode ray polar-coordinate oscilloscope which indicates continuously such different strata by the relative thickness of an annular trace on the screen of such oscilloscope, of a reference signal adjustment for such system comprising a balancing differential transformer connected in parallel with such signal circuit through a phase-shift network having an adjustable component, said balancing differential transformer having an adjustable component, either or both of which components providing means by which the value of such trace can be controlled.

4. In a strata indicating-scanning system the combination with a signal transmitting circuit including a signal source comprising a differential transformer for producing an output signal that is responsive to the different strata being scanned, and a signal receiver which indicates continuously such different strata by the relative thickness of a trace of a reference signal adjustment for such system comprising a differential transformer connected in effect in series with such signal circuit, said differential transformer having a manually adjustable component by means of which the no-load value of such signal can be set while the system is in operation.

5. In a strata indicating-scanning system the combination with a signal transmitting circuit including a signal source comprising a differential transformer for producing an output signal that is responsive to the different strata being scanned, and a signal receiver comprising a cathode ray polar-coordinate oscilloscope which indicates continuously such different strata by the relative thickness of an annular trace on the screen of such oscilloscope, of a reference signal adjustment for such system comprising a balancing differential transformer connected across a resistor in series with such signal circuit, said balancing differential transformer having a manually adjustable core by means of which the no-load value of such signal can be set.

6. In a strata indicating-scanning system the combination of a signal transmitting circuit including a signal source comprising a differential transformer for producing an output signal that is responsive to the different strata being scanned, a signal receiver which indicates continuously such different strata by the relative value of such signal, and a reference signal adjustment therefor by means of which the no-load value of such reference signal can be set, said adjusting means comprising an impedance in series with such signal source and receiver, and means for applying an adjustable bucking voltage across said impedance.

7. In a strata indicating-scanning system the combination of a signal transmitting circuit including a signal source comprising a differential transformer for producing an output signal that is responsive to the different strata being scanned, a signal receiver which indicates continuously such different strata by the relative value of such signal, and a reference signal adjustment therefor by means of which the no-load value of such reference signal can be set, said adjusting means comprising an isolation transformer, an A. C. source for energizing the differential transformer and said isolation transformer, a potentiometer energized by said isolation transformer, and a capacitor connected across said potentiometer and in series with the signal source of said receiver.

8. In a strata indicating-scanning system the combination with a signal transmitting circuit including a signal source comprising a positional transducer including a differential transformer that is responsive to the different strata being scanned, and a signal receiver comprising a cathode ray polar-coordinate oscilloscope which indicates continuously such different strata by the relative thickness of an annular trace on the screen of such oscilloscope, of a reference signal adjustment for such system comprising a balancing differential transformer associated with such signal circuit, said balancing differential transformer having adjustable means by which the no-load deflection value of such trace can be minimized when the scanner is at rest as well as when it is moving.

References Cited in the file of this patent

UNITED STATES PATENTS

| | | |
|---|---|---|
| 2,178,074 | Jakel et al. | Oct. 31, 1939 |
| 2,281,960 | Vacquier | May 5, 1942 |
| 2,676,253 | Ayres | Apr. 20, 1954 |